United States Patent
Joo et al.

(10) Patent No.: US 10,333,126 B2
(45) Date of Patent: Jun. 25, 2019

(54) FUSION TYPE COMPOSITE SEPARATION MEMBRANE FOR LITHIUM SECONDARY BATTERY, AND PREPARATION METHOD THEREFOR

(71) Applicant: SK Innovation Co., Ltd., Seoul (KR)

(72) Inventors: Dong Jin Joo, Daejeon (KR); Su Ji Lee, Daejeon (KR); Kyu Young Cho, Daejeon (KR); Yun Bong Kim, Daejeon (KR); Jae Woong Kim, Daejeon (KR)

(73) Assignee: SK Innovation Co., Ltd., Seoul (KR)

( * ) Notice: Subject to any disclaimer, the term of this patent is extended or adjusted under 35 U.S.C. 154(b) by 77 days.

(21) Appl. No.: 15/562,534

(22) PCT Filed: Apr. 1, 2016

(86) PCT No.: PCT/KR2016/003428
§ 371 (c)(1),
(2) Date: Sep. 28, 2017

(87) PCT Pub. No.: WO2016/159724
PCT Pub. Date: Oct. 6, 2016

(65) Prior Publication Data
US 2018/0114968 A1  Apr. 26, 2018

(30) Foreign Application Priority Data
Apr. 2, 2015 (KR) .................. 10-2015-0046671

(51) Int. Cl.
| | |
|---|---|
| *H01M 2/16* | (2006.01) |
| *H01M 2/14* | (2006.01) |
| *H01M 10/02* | (2006.01) |
| *H01M 10/0525* | (2010.01) |
| *H01M 10/42* | (2006.01) |
| *H01M 10/052* | (2010.01) |

(52) U.S. Cl.
CPC ......... *H01M 2/1686* (2013.01); *H01M 2/145* (2013.01); *H01M 2/16* (2013.01); *H01M 2/166* (2013.01); *H01M 2/1653* (2013.01); *H01M 10/02* (2013.01); *H01M 10/0525* (2013.01); *H01M 10/4235* (2013.01); *H01M 10/052* (2013.01); *H01M 2220/20* (2013.01); *Y02E 60/122* (2013.01)

(58) Field of Classification Search
CPC .... H01M 2/1686; H01M 2/16; H01M 2/1653; H01M 10/4235; H01M 2/166; H01M 2/145
See application file for complete search history.

(56) References Cited

U.S. PATENT DOCUMENTS

| | | | |
|---|---|---|---|
| 2012/0070644 A1* | 3/2012 | Kang | B01D 69/02 428/220 |
| 2013/0280583 A1 | 10/2013 | Lee et al. | |
| 2015/0140404 A1 | 5/2015 | Yoo et al. | |
| 2016/0164059 A1* | 6/2016 | Hong | H01M 2/1686 429/144 |
| 2017/0149040 A1* | 5/2017 | Suzuki | H01M 2/1646 |

FOREIGN PATENT DOCUMENTS

| | | |
|---|---|---|
| JP | 4127989 B2 | 7/2008 |
| KR | 101156961 B1 | 6/2012 |
| KR | 1020130052526 A | 5/2013 |
| KR | 101341196 B1 | 12/2013 |
| KR | 1020130136149 A | 12/2013 |
| KR | 101430975 B1 | 8/2014 |
| KR | 1020150001148 A | 1/2015 |

* cited by examiner

*Primary Examiner* — Stewart A Fraser
(74) *Attorney, Agent, or Firm* — The Webb Law Firm

(57) ABSTRACT

The present invention relates to a composite separation membrane for a lithium secondary battery having excellent lifetime and safety improvement effects, and a preparation method therefor and, more specifically, to a composite separation membrane for a lithium secondary battery, including: a porous base layer; a heat resistant layer formed on one surface or both surfaces of the porous base layer; and a fusion layer formed on the outermost layer. Inorganic particles in the heat resistant layer are connected and fixed by a binder polymer, and the fusion layer is prepared by comprising amorphous polymer particles having a glass transition temperature of 30 to 90° C. and a difference between a fusion temperature and the glass transition temperature of 60° C. or lower.

11 Claims, No Drawings

FUSION TYPE COMPOSITE SEPARATION MEMBRANE FOR LITHIUM SECONDARY BATTERY, AND PREPARATION METHOD THEREFOR

CROSS-REFERENCE TO RELATED APPLICATIONS

This application is the United States national phase of International Application No. PCT/KR2016/003428 filed Apr. 1, 2016, and claims priority to Korean Patent Application No. 10-2015-0046671 filed Apr. 2, 2015, the disclosures of which are hereby incorporated in their entirety by reference.

TECHNICAL FIELD

The present invention relates to a fusion type composite separation membrane for a lithium secondary battery having improved battery lifetime and safety, and a preparation method therefor.

BACKGROUND ART

As the use of lithium secondary batteries has been gradually expanded, demand for a large size and high capacity has become increased. Further, in recent years, the capacity of the battery has been rapidly increasing, and an area of an electrode plate used for this purpose is also rapidly widening. In the case of such a high capacity battery, when the battery is charged and discharged for a long period of time, a cathode electrode plate and an anode electrode plate may not be in close contact with each other but separated, or the battery may be expanded or deformed, and thus, a lifetime of the battery may be reduced.

Accordingly, various methods for imparting functionality to a porous thin film type film formed of polyethylene or polypropylene, which is a separation membrane used in the lithium secondary battery, have been attempted. As one of such attempts, there is a method for improving performance of a battery by coating fusion layers on both sides of the separation membrane, and fusing the separation membrane with a cathode and an anode of the battery. That is, it is possible to improve a lifetime of the battery by imparting the separation membrane to a fusion property (or adhesive property) and fusing the separation membrane with electrodes to prevent separation of electrode plates or expansion or deformation of the battery as described above.

Meanwhile, when heat stability of a polyolefin-based microporous membrane is reduced, a short-circuit between the electrodes accompanied with damage or deformation of the microporous membrane may occur due to temperature rise caused by abnormal behavior of the battery. Further, there is a risk of overheating, ignition or explosion of the battery.

Thus, an approach to improve safety of the battery by imparting a separate property in addition to the above-described fusion property to the separation membrane, is in progress.

Japanese Patent No. 4,127,989 discloses a separation membrane in which a porous fusion layer formed of an organic polymer that swells an electrolyte on both sides of a base of a polyolefin microporous membrane and supports the electrolyte is disposed. The above technique has advantages in view of ion conductivity and fusion property, but has a problem in that thermal resistance is insufficient, and the fusion layer has a thick thickness, which is contrary to the demand for thinning the separation membrane.

Korean Patent No. 1156961 discloses that by partially coating a silane-based compound on upper and lower outer circumferential surfaces of the electrode and the separation membrane, it is possible to prevent deterioration of the ion conductivity by a fusion layer while increasing fusion force. However, a large-area battery has a limitation in that when only the vicinity of the upper and lower outer circumferential surfaces of the separation membrane is fused, a middle portion of the electrode may not be prevented from being separated.

DISCLOSURE

Technical Problem

An object of the present invention is to provide a novel fusion type composite separation membrane for a lithium secondary battery capable of having good fusion property with electrodes, improved high strength, chemical resistance, electrochemical resistance, and heat resistance, and in particular, having remarkably improved adhesive property with the electrodes, and improved room temperature lifetime, and a preparation method therefor.

Technical Solution

In one general aspect, a composite separation membrane for a lithium secondary battery includes: a porous base layer; a heat-resistant layer including inorganic particles connected and fixed by a binder polymer, and formed on the porous base layer; and a fusion layer including amorphous polymer particles having a glass transition temperature of 30° C. or higher to 90° C. or lower, and formed on the heat-resistant layer.

A difference between the glass transition temperature of the amorphous polymer particles and a fusion temperature required for fusing the composite separation membrane with electrodes may be 60° C. or lower.

The composite separation membrane for a lithium secondary battery may further include: an interfacial layer formed between the heat-resistant layer and the fusion layer and having the inorganic particles and the amorphous polymer particles mixed therein.

In the present invention, the heat-resistant layer includes 60 to 99 wt % of the inorganic particles and 40 to 1 wt % of the binder polymer based on 100 wt % of the total weight of the composition, wherein the inorganic particle preferably has a size of 0.1 to 2.0 μm. The heat-resistant layer may include one or two or more inorganic particles selected from alumina oxide such as alumina, boehmite, etc., barium titanium oxide, titanium oxide, magnesium oxide, clay, glass powder, boron nitride, and aluminum nitride, but the inorganic particles are not necessarily limited thereto.

Examples of the binder of the heat-resistant layer in the present invention may include one or two or more selected from polyvinylidene fluoride-hexafluoropropylene (PVdF-HFP), polymethyl methacrylate (PMMA), polyacrylonitrile (PAN), polyvinylpyrrolidone, polyimide, polyethylene oxide (PEO), cellulose acetate, polyvinyl alcohol (PVA), carboxymethylcellulose (CMC), etc., but the binder of the heat-resistant layer is not necessarily limited thereto.

In the present invention, the fusion layer is a layer including amorphous polymer particles, and the amorphous polymer particles may have a glass transition temperature (Tg) of 30° C. or higher to 90° C. or lower, and a difference between the glass transition temperature of the amorphous polymer particles and a heat-fusion temperature may be 60° C. or lower. The heat-fusion temperature is generally based on the range of 70 to 100° C., and the difference between the glass transition temperature and the heat-fusion temperature is based on the case where the heat-fusion is performed at 70 to 100° C.

Within the above-described condition, permeability is not reduced, the battery lifetime is prolonged, and safety of the battery is also increased.

In the present invention, the amorphous polymer particles of the fusion layer may have a size of 0.05 to 0.8 μm in achieving the purpose of the present invention. Further, it is preferable that the fusion layer may have a thickness of 1.0 μm or less.

In the present invention, the amorphous polymer used in the fusion layer is not limited, but may be a polymer material which is an acrylate-based polymer, or a methacrylate-based polymer, or a copolymer thereof, having a glass transition temperature of 30 to 90° C., which is because by controlling a proportion of monomers of copolymerization, it is convenient to control the glass transition temperature of the amorphous polymer, but the reason is not necessarily limited thereto.

In the case of the amorphous polymer in the form of particles, the glass transition temperature preferably has a range of 30 to 90° C., which is preferable since good battery properties such as adhesive strength, room temperature lifetime, etc., or good physical properties in the laminate are exhibited even if the heat-fusion condition for fusing the separation membrane with the electrode is mostly performed at a temperature of 70 to 100° C. When the fusion layer satisfies the above-described conditions in the present invention, the adhesive strength may be remarkably excellent and the room temperature lifetime of the battery may be remarkably improved.

Further, in the present invention, it was confirmed that when the inorganic particles used in the heat-resistant layer were further added, the fusion layer imparted more excellent adhesive property to exhibit excellent results in safety and performance of the battery. In this case, the inorganic particles preferably have a content of 30 vol % or less with respect to a content of the total particles of the fusion layer.

Further, in the present invention, when the composite separation membrane is fused with an electrode, fusion may be performed both in a state where an electrolyte is included and in a state where the electrolyte is not included. A case where the composite separation membrane is fused with the electrode while including the electrolyte is more effective in implementing fusion force.

In particular, unlike a pouch type battery, in the case of a cylindrical battery and a prismatic battery, the electrode and the separation membrane, which are constituent elements, are included in a hard cylinder or a can, but are not able to be fused by applying temperature and pressure after the battery is assembled, and thus, the present invention is effective when the fusion is performed by fusing the electrode and the separation membrane in advance, putting the fused electrode and separation membrane in a cylinder or a can, and injecting the electrolyte thereinto.

Advantageous Effects

The composite separation membrane according to the present invention may be mainly applied to improve the lifetime and safety of a pouch type lithium secondary battery or a cylindrical lithium secondary battery, and may exhibit significantly excellent fusion performance regardless of a case where the battery is manufactured by heat-fusion and the electrolyte is then injected or a case where the electrolyte is injected and the heat-fusion is then performed, but the present invention is not limited thereto.

The composite separation membrane according to the present invention may be uniformly and strongly fused over the entire area of the cathode and the anode of the secondary battery having a large area while simultaneously improving the lifetime and safety of the battery, and may facilitate ion movement through uniformly distributed pores of each layer, which is advantageous in improving performance of a large-sized secondary battery for an electric vehicle, and in providing very good lifetime characteristic of the battery.

BEST MODE

Hereinafter, the present invention is described in detail.

Examples and drawings to be described below are provided by way of example so that the idea of the present invention can be sufficiently transferred to those skilled in the art to which the present invention pertains. Meanwhile, unless technical and scientific terms used herein are defined otherwise, they have meanings that are generally understood by those skilled in the art to which the present invention pertains. Known functions and components which obscure the description and the accompanying drawings of the present invention with unnecessary detail will be omitted.

The present invention relates to a composite separation membrane for a lithium secondary battery including: a porous base layer;

a heat-resistant layer including inorganic particles connected and fixed by a binder polymer, and formed on the porous base layer; and a fusion layer including amorphous polymer particles having a glass transition temperature of 30° C. or higher to 90° C. or lower, and formed on the heat-resistant layer.

A difference between the glass transition temperature of the amorphous polymer particles and a fusion temperature of the fusion layer may be 60° C. or lower.

In the present invention, the composite separation membrane for a lithium secondary battery may further include: an interfacial layer formed between the heat-resistant layer and the fusion layer and having the inorganic particles and amorphous polymer particles mixed therein, and a thickness of the interfacial layer may be 40% or less of a thickness of the fusion layer.

In the present invention, any one of a case where the fusion layer is stacked on one side of the heat-resistant layer and a case where the fusion layers are stacked on both sides of the heat-resistant layer may be included in the scope of the present invention as long as the fusion layer is stacked on the heat-resistant layer.

Further, according to another aspect of the present invention, it is possible to manufacture a composite separation membrane capable of providing a high energy battery in which lifetime of a battery is further improved and electrical properties are excellent by maintaining surface roughness of the composite separation membrane to be 0.3 μm or less. This is because it is possible to improve electrical properties of the battery by uniformly forming adhesion with the electrode.

In the present invention, the porous base layer is not limited as long as it is a polyolefin-based microporous membrane. Further, the porous base layer is not particularly limited as long as it is a porous membrane which is capable of being applied to a battery while having pores inside a nonwoven fabric, paper, and a microporous film thereof or having pores with inorganic particles on a surface thereof.

The polyolefin-based resin is preferably at least one polyolefin-based resin alone, or a mixture thereof, and in particular, is preferably at least one or two selected from polyethylene, polypropylene, and a copolymer thereof. Further, the base layer may be formed of the polyolefin resin alone or may be formed by further including inorganic particles or organic particles while including the polyolefin resin as a main component. In addition, the base layer may be formed by constituting the polyolefin-based resin into multiple layers, and it is not excluded that any one or all of the base layers constituted in multiple layers include inorganic particles and organic particles in the polyolefin resin.

A thickness of the porous base layer is not particularly limited, but may be preferably 5 to 30 μm. The porous base layer is a porous polymer film mainly formed by stretching.

A manufacturing method for a polyolefin-based porous base layer according to an exemplary embodiment of the present invention is not limited as long as the polyolefin-based porous base layer is manufactured by a person skilled in the art, but in an exemplary embodiment, the polyolefin-based porous base layer may be manufactured by a dry method or a wet method. The dry method is a method in which micropores are formed by forming a polyolefin film and then stretching the film at a low temperature, which causes micro cracks between lamellas which are crystalline parts of polyolefin. The wet method is a method in which a polyolefin-based resin and a diluent are kneaded at a high temperature at which the polyolefin-based resin is melted to form a single phase, the polyolefin and the diluent are subjected to phase-separation during a cooling process, and then, the diluent is extracted to form pores therein. The wet method is a method for imparting mechanical strength and transparency through a stretching/extraction process after a phase separation process, which may be more preferable because a film thickness is thin, a pore size is uniform, and physical properties are excellent as compared to the dry method.

The diluent is not limited as long as it is an organic material which forms the single phase with the polyolefin-based resin. Examples of the diluent may include aliphatic hydrocarbons such as nonane, decane, decalin, paraffin oil, paraffin wax, etc., phthalic acid esters such as dibutyl phthalate, dioctyl phthalate, etc., and C10-C20 fatty acids such as palmitic acid, stearic acid, oleic acid, linoleic acid, linolenic acid, etc., and C10-C20 fatty acid alcohols such as palmitic acid alcohol, stearic acid alcohol, oleic acid alcohol, etc., a mixture thereof, etc.

Hereinafter, the heat-resistant layer of the present invention will be described in detail, but the present invention is not limited thereto.

In the present invention, the heat-resistant layer is bonded to the base layer by mixing a small amount of binder with inorganic particles, and thus, heat stability, electrical safety, and electrical characteristics of the battery may be increased, and further, shrinkage of the base layer occurred at a high temperature may be suppressed.

A size of the inorganic particles of the heat-resistant layer is not largely limited, but it is preferable to mix the binder polymer with the inorganic particles having a size of 0.1 to 2.0 μm and coat the mixture on one side or both sides of the base layer to have a thickness of 1 to 10 μm in that the desirable effect of the present invention may be easily achieved.

The heat-resistant layer may include 60 to 99 wt % of inorganic particles and 40 to 1 wt % of binder polymer based on 100 wt % of the total weight of the composition. Within the above-described contents, it is preferable in that performance of the battery may be effectively achieved.

The inorganic particles included in the heat-resistant layer are rigid so that deformation does not occur due to external impact or force, and heat deformation and side reactions even at high temperature are prevented from occurring. The inorganic particles included in the heat-resistant layer are preferably one or two or more selected from the group consisting of alumina, boehmite, aluminum hydroxide, titanium oxide, barium titanium oxide, magnesium oxide, magnesium hydroxide, silica, clay, and glass powder, but are not limited thereto.

The binder polymer included in the heat-resistant layer in the present invention acts as a binder for connecting and stably fixing the inorganic particles, and is preferably one or two or more selected from the group consisting of polyvinylidene fluoride (PVdF), polyvinylidene fluoride-hexafluoropropylene (PVdF-HFP), polymethyl methacrylate (PMMA), polyacrylonitrile (PAN), polyvinylpyrrolidone, polyimide, polyethylene oxide (PEO), cellulose acetate, polyvinyl alcohol (PVA), carboxymethyl cellulose (CMC), and polybutyl acrylate, but is not limited thereto. The heat-resistant layer may further include an acrylic polymer or a butadiene-based polymer to improve adhesive force, as needed.

The solvent used for forming the heat-resistant layer of the present invention is not largely limited as long as it is able to dissolve the binder and disperse the inorganic particles, but for example, may be one or two or more selected from water, methanol, ethanol, 2-propanol, acetone, tetrahydrofuran, methyl ethyl ketone, ethyl acetate, N-methylpyrrolidone, dimethylacetamide, dimethylformamide, dimethylformamide, etc.

The heat-resistant layer has a thickness of 1 to 20 μm, preferably from 1 to 10 μm, on one side or both sides of the base layer by mixing the inorganic particles with the binder polymer, which is preferable in that heat resistance may be ensured and ion permeability is relatively high to improve battery capacity.

Next, the fusion layer of the present invention will be described.

The fusion layer according to an exemplary embodiment of the present invention is formed on the outermost layer of the composite separation membrane and is uniformly adhered to an electrode plate at a predetermined interval by adhering the electrode plate and the separation membrane, wherein any one of a case where the fusion layer is stacked on one side of the heat-resistant layer and a case where the fusion layers are stacked on both sides of the heat-resistant layer may be included in the scope of the present invention as long as the fusion layer is stacked on the heat-resistant layer. Specifically, a stacked form of the fusion layer/the heat-resistant layer/the porous base layer/the heat-resistant layer/the fusion layer, a stacked form of the fusion layer/porous base layer/heat-resistant layer/fusion layer, and a stacked form of the porous base layer/heat-resistant layer/fusion layer, etc., may be implemented, but the present invention is not limited to the stacked form.

The fusion layer of the present invention may fuse the electrode plate and the separation membrane to increase adhesive force over the entire area of the anode plate and the cathode plate, thereby strongly, uniformly, and constantly adhering the anode and cathode closely, and thus, the performance and the lifetime of the battery may be remarkably increased. In the present invention, the fusion layer may be formed in the form of polymer particles, and thus, significantly excellent characteristics of the battery may be imparted. Further, ion mobility may be secured through each space between the polymer particles. In particular, when the polymer particles of the fusion layer having the characteristic of the present invention are used, fusion property and lifetime of the battery may be excellent to prevent the local close-adhesion defect, thereby increasing characteristics of the battery.

The polymer particles constituting the fusion layer of the present invention may have a size of 0.05 to 0.8 µm. Within the above-described range, lithium ions may be smoothly transferred, resistance may be low, and the performance may not be deteriorated even at the fusion temperature. The thickness of the fusion layer of the present invention is preferably adjusted to be 2 µm or less, and more preferably, 1 µm or less. When the thickness is excessively large, a distance that lithium ions are required to move is increased, and as a result, a problem in that resistance is increased occurs. Therefore, it is preferable that the thickness of the fusion layer is 2 µm or less.

Further, when the thickness is maintained as above, surface roughness after the fusion layer is formed may be excellent, and thus, battery performance may be improved. Accordingly, when the particle diameter and the thickness are simultaneously satisfied, the battery performance and the adhesive force with the electrodes are harmonized to have a remarkable effect as the purpose of the present invention.

All of the inorganic particles and polymer materials used as raw materials of the separation membrane are required to be chemically and electrochemically stable in the secondary battery.

The amorphous polymer material of the fusion layer is not particularly limited as long as fusion force between the electrode and the separation membrane is capable of being secured. However, it is preferable to use a material exhibiting fusion force only when the temperature and the pressure are increased at the time of manufacturing the battery. In particular, when an ambient temperature is high during transportation, overlapping heat-fusion layers may be fused to each other, and thus, it is not usable as the separation membrane. Therefore, when the separation membranes are doubled, it is preferable that the fusion force between the overlapping porous fusion layers is 0.3 gf/cm or less at a temperature of 60° C. or less and a pressure of 1 MPa or less. This is preferable since even when the temperature rises during storage and transportation, the fusion layer and the fusion layer do not adhere to each other and may be stored for a long period of time.

Further, it is the most preferable to select the polymer material so that the fusion force between the separation membrane and the electrode is 1.0 gf/cm or more at a temperature of 70 to 100° C. and a pressure of 1 MPa or more, and to constitute the fusion layer.

When the fusion layer including amorphous polymer particles having a glass transition temperature (Tg) of 30° C. to 90° C., and having a temperature difference between the glass transition temperature and a heat-fusion temperature (based on 70 to 100° C.) of 60° C. or lower, as organic polymer particles, is formed in the present invention, as described above, a low adhesive force is exhibited at a low pressure and a low temperature, and a high adhesive force, preferably, 5 gf/cm or more, more preferably 8 gf/cm or more, very preferably, 10 gf/cm or more is exhibited at a high temperature and a high pressure. When the organic polymer particles of the fusion layer are not amorphous polymer particles having a glass transition temperature of 30° C. to 90° C., it is difficult to show a large deviation when measuring the adhesive force. That is, it is difficult to maximize the difference between the adhesive force when the fusion is performed at a low temperature of 60° C. or lower and the fusion force when the fusion is performed at a temperature of 70 to 100° C.

In the present invention, the amorphous polymer used in the fusion layer is not limited, but an acrylate-based polymer or a methacrylate-based polymer having a glass transition temperature of 30 to 90° C. or a copolymer thereof is preferably used as the polymer material. This is because by controlling the proportion of the monomers of the copolymerization, it is easy to control the glass transition temperature as the amorphous polymer and desired effects of the present invention may be exerted, but the present invention is not necessarily limited thereto.

In order to stably maintain pores when pressure is applied, the fusion layer of the present invention may be constituted by mixing an adhesive polymer material and inorganic particles under the condition that the effect of the present invention may be sufficiently exhibited, wherein up to 30% by volume of the inorganic particles may be included with respect to the total volume of the particles, but the content thereof may be included as long as the effect of the present invention may be sufficiently achieved. The inorganic particles of the fusion layer are not largely limited, and for example, may include one or two or more inorganic particles selected from aluminum oxide such as boehmite, etc., barium titanium oxide, titanium oxide, magnesium oxide, clay, glass powder, boron nitride, and aluminum nitride, but are not limited thereto.

A method for forming a separation membrane according to the present invention will be described.

The method for forming the heat-resistant layer and the fusion layer of the separation membrane in the present invention is not particularly limited as long as it is general methods adopted in the art. For example, a bar coating method, a rod coating method, a die coating method, a wire coating method, a comma coating method, a micro gravure/gravure method, a dip coating method, a spray method, an ink-jet coating method, a combination method thereof, a modification method, etc., may be used.

However, in the present invention, in order to significantly improve room temperature lifetime stability, heat stability, dimensional stability, surface roughness, etc., it is more preferable to adopt a simultaneous coating method in which the heat-resistant layer is coated, and then the fusion layer is directly coated without drying the heat-resistant layer, etc., followed by drying the two layers together, thereby preparing the separation membrane, which is another feature of the present invention.

Specifically, the preparation method for a composite separation membrane for a lithium secondary battery according to an exemplary embodiment of the present invention may include:

applying a heat-resistant layer coating liquid including inorganic particles and a binder polymer to one side or both sides of a porous base;

applying a fusion layer coating liquid including amorphous polymer particles having a glass transition temperature of 30° C. or higher to 90° C. or lower on the applied heat-resistant layer coating liquid; and performing a drying process.

Particularly, in the above-described preparation method, it is possible to obtain a remarkable effect by employing the simultaneous coating method.

That is, the simultaneous coating method in which heat-resistant layer coating liquid is applied, and then the fusion layer coating liquid is sequentially applied without drying the heat-resistant layer coating liquid, followed by drying to prepare the separation membrane, is preferred. By adopting the simultaneous coating method, the coating layer of the heat-resistant layer and the coating layer of the fusion layer may be allowed to freely move, thereby being mixed and adhered at a predetermined thickness at the interface of the two layers, and thus, a surface of the fusion layer may be coated very uniformly, the heat-resistant layer and the fusion layer may be semi-permanently adhered, and the battery lifetime stability and the battery performance may be further improved.

That is, accordingly, the composite separation membrane may further include an interfacial layer in which the inorganic particles and the amorphous polymer particles are mixed between the heat-resistant layer and the fusion layer. In the present invention, the degree of the interfacial layer is not particularly limited, but may be observed experimentally up to 40% of the thickness of the fusion layer, but the present invention is not necessarily limited thereto.

Therefore, the composite film of the present invention is not damaged by long-term use at the stacked interface of each layer, and thus, a long lifetime of the battery is remarkably increased. When the composite separation membrane is manufactured by coating and drying the heat-resistant layer, and then coating and drying the fusion layer, it was confirmed that the long-term lifetime was lowered by 10%, in some cases by 30% or more due to poor adhesive property at the interface, and the frequency of battery capacity according to charging and discharging was remarkably decreased.

The solvent used in the coating liquid for forming the heat-resistant layer or the fusion layer of the present invention is not particularly limited, but for example, may be one or more selected from water, methanol, ethanol, 2-propanol, acetone, tetrahydrofuran, methyl ethyl ketone, ethyl acetate, N methylpyrrolidone, dimethylacetamide, dimethylformamide, etc.

The lithium secondary battery according to an exemplary embodiment of the present invention may be manufactured by including a composite separation membrane, a cathode, an anode, and a non-aqueous electrolyte.

The cathode and the anode may be manufactured by mixing a solvent with a cathode active material and an anode active material, if necessary, with a binder, a conductive material, a dispersing material, etc., followed by stirring to prepare a mixture, and applying the mixture to a current collector of a metal material, followed by drying and pressing.

The cathode active material is any active material that is generally used for the cathode of the secondary battery. For example, the cathode active material may be lithium metal oxide particles containing one or two or more metals selected from the group consisting of Ni, Co, Mn, Na, Mg, Ca, Ti, V, Cr, Cu, Zn, Ge, Sr, Ag, Ba, Zr, Nb, Mo, Al, Ga, B, and a combination thereof.

The anode active material is any active material that is generally used for the anode of the secondary battery. The anode active material of the lithium secondary battery is preferably a material capable of performing lithium intercalation. As a non-limiting example, the anode active material may be one or two or more materials selected from the group consisting of lithium (metal lithium), graphitizable carbon, non-graphitizable carbon, graphite, silicon, Sn alloy, Si alloy, Sn oxide, Si oxide, Ti oxide, Ni oxide, Fe oxide (FeO), and lithium-titanium oxide ($LiTiO_2$, $Li_4Ti_5O_{12}$).

As the conductive material, a conventional conductive carbon material may be used without any particular limitation.

The current collector of the metal material is a metal having high conductivity and capable of being easily adhered to the mixture of the cathode active material or the anode active material, and may be any metal as long as it is not reactive in a voltage range of the battery. Non-limiting examples of the cathode current collector may include foil made of aluminum, nickel or a combination thereof. Non-limiting examples of the anode current collector may include a foil made of copper, gold, nickel or copper alloy or a combination thereof.

A separation membrane is interposed between the cathode and the anode. As a method for applying the separation membrane to a battery, it is possible to perform lamination, stacking and folding of the separation membrane and the electrode in addition to winding which is a general method.

A non-aqueous electrolyte includes a lithium salt as an electrolyte and an organic solvent. The lithium salt may be used without limitation as long as it is generally used for an electrolyte for a lithium secondary battery, and may be represented by $Li^+X^-$.

Anion ions of the lithium salt are not particularly limited, but may be any one or two or more selected from $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$.

Examples of the organic solvent may include any one or a mixture of two or more selected from the group consisting of propylene carbonate, ethylene carbonate, diethyl carbonate, dimethyl carbonate, ethylmethyl carbonate, methylpropyl carbonate, dipropyl carbonate, dimethyl sulfoxide, acetonitrile, dimethoxyethane, diethoxyethane, sulfolane, gamma-butyrolactone, and tetrahydrofuran.

The non-aqueous electrolyte may be injected into an electrode structure composed of a cathode, an anode, and a separation membrane interposed between the cathode and the anode.

An external shape of the lithium secondary battery is not particularly limited, but may be a cylindrical shape, a prismatic shape, a pouch shape, a coin shape, or the like, using a can.

Hereinafter, Examples will be provided in order to describe the present invention in more detail. However, the present invention is not limited to Examples below.

Properties of each of the separation membranes for a lithium secondary battery prepared in Examples and Comparative Examples of the present invention were evaluated by the following methods.

1. Measurement of Gas Permeability

A method for measuring gas permeability of the separation membrane was conducted according to JIS P8117 standard, and time required for passing 100 cc of air through an area of 1 $inch^2$ of the separation membrane was recorded in seconds and compared.

2. Measurement of Heat Shrinkage Ratio at 130° C.

The method for measuring a heat shrinkage ratio at 130° C. of the separation membrane was as follows: a separation membrane was cut into a square shape having a side length of 10 cm to prepare a sample, and an area of the sample before the experiment was measured and recorded using a camera. Five sheets of paper were placed at the top and bottom of the sample, respectively, so that the sample is in the center, and then four sides of the paper were fixed with a clip. The sample wrapped in paper was left in a 130° C. hot air drying oven for 1 hour. Once the sample was left in the oven for 1 hour, the sample was taken out, and the area of the separation membrane was measured using a camera to calculate a shrinkage ratio according to Equation 1 below:

Shrinkage ratio (%)=(area before heating−area after heating)×100/area before heating    [Equation 1]

3. Measurement of Adhesive Strength

A sample for measuring a fusion force between the separation membrane and the electrode was prepared as follows: one sheet of the separation membrane was inserted between the cathode electrode plate and the anode electrode plate, immersed in an electrolyte for 1 hour, taken out, and placed immediately in a hot press, and fused by applying heat and pressure at 100° C. and 1 MPa for 150 seconds. The prepared sample was immersed again in the electrolyte for 1 hour, and taken out, and then a 180° peel strength was measured immediately before the electrolyte was evaporated.

4. Measurement of Lifetime of Battery

Each battery manufactured through the above-described assembling process was charged and discharged 500 times at a discharge rate of 1 C, and a discharge capacity thereof was measured to conduct a cycle evaluation for measuring a degree at which the capacity was reduced as compared to an initial capacity.

5. Measurement of Thickness of Battery

In order to confirm a separation phenomenon between the electrode plate and the separation membrane and the deformation of the battery when the battery was charged and discharged, a thickness of the battery was measured after 500 cycles of charging and discharging, using a Thickness Gauge manufactured by Mitsutoyo. Then, the measured thickness was compared with a thickness before the charging and discharging, and an increase rate in the battery thickness was measured according to Equation 2 below:

Increase rate in battery thickness (%)=(B−A)/A×100    [Equation 2]

A: Battery thickness before charging and discharging (mm)

B: Battery thickness after charging and discharging (mm)

6. Evaluation of Surface Roughness (Ra)

A separation membrane having a size of 5×5 μm was prepared as a sample, and Ra value was measured based on a total size of the sample by Roughness Analysis using AFM (Digital Instruments Nanoscope V MMAFM-8 Multimode).

7. Measurement of Battery Safety

In order to measure the safety of the battery, each manufactured battery was fully charged with SOC (charge rate) of 100%, and nail penetration evaluation was performed. Here, a diameter of the nail was 3.0 mm, and a penetration speed of the nail was fixed to 80 mm/min. L1: no change, L2: slight heat generation, L3: leakage, L4: fuming, L5: ignition, L1 to L3: pass, L4 to L5: fail.

Example 1

Preparation of Cathode 94 wt % of $LiCoO_2$ (D50, 15 μm), 2.5 wt % of polyvinylidene fluoride, and 3.5 wt % of carbon black (D50, 15 μm) were added to NMP (N-methyl-2-pyrrolidone) and stirred to prepare a uniform cathode slurry. The slurry was coated on an aluminum foil having a thickness of 30 μm, dried and pressed to prepare a cathode electrode plate having a thickness of 150 μm.

Preparation of Anode 95 wt % of graphite, 3 wt % of acrylic latex (solid content of 20 wt %) having Tg of −52° C., and 2 wt % of CMC (carboxymethyl cellulose) were added to water as a solvent and stirred to prepare a uniform anode slurry. The slurry was coated on a copper foil having a thickness of 20 μm, dried and pressed to prepare an anode electrode plate having a thickness of 150 μm.

Preparation of Composite Separation Membrane 94 wt % of alumina particles having an average particle diameter of 1.0 μm, 2 wt % of polyvinyl alcohol having a melting temperature of 220° C. and a saponification degree of 99%, 4 wt % of acrylic latex (solid content of 20 wt %) having Tg of −52° C. were added to water as a solvent and stirred to prepare a uniform heat-resistant layer slurry.

Spherical particles (0.5 μm) formed of a copolymer of 15 wt % of methyl methacrylate and butyl acrylate dispersed in water and having a glass transition temperature of 48° C. were used as a fusion layer slurry.

A total of four heat-resistant layers formed of the heat-resistant layer slurry and the fusion layer slurry were coated simultaneously and continuously without a separate drying process on front surface/rear surface of a polyolefin microporous membrane base (porosity of 35%) having a thickness of 7 μm and manufactured by SK Innovation, by using two multilayer slot coating dies. Water of the simultaneously coated microporous membrane was evaporated in a drier and the membrane wound in a roll form. Both-sided heat-resistant layer had a thickness of 1.5 μm, respectively, and the both-sided fusion layer had a thickness of 0.8 μm, respectively.

Manufacture of Battery

A pouch type battery was assembled by stacking the cathode, anode, and separation membrane prepared as above. An electrolyte prepared by mixing ethylene carbonate (EC)/ethyl methyl carbonate (EMC)/dimethyl carbonate (DMC) at a volume ratio of 3:5:2 and containing 1M of lithium hexafluorophosphate ($LiPF_6$) dissolved therein, was injected into the assembled battery to manufacture a lithium secondary battery having a capacity of 1,500 mAh. Then, in order to fuse the cathode, anode, and separation membrane to each other, the battery was placed in a hot press, and heat-fused by applying heat and pressure at 100° C. and 1 MPa for 150 seconds.

Example 2

Example 2 was performed in the same manner as in Example 1 except that the pouch type battery was assembled in the stacking manner, and heat-fused by applying heat and pressure at 100° C. and 1 MPa for 150 seconds without injecting a separate electrolyte, and then the electrolyte was injected.

Example 3

Example 3 was performed in the same manner as in Example 1 except that the heat-resistant layer slurry and the fusion layer slurry were used. As a result, both-sided heat-resistant layer had a thickness of 2.5 μm, respectively, and the both-sided fusion layer had a thickness of 1.0 μm, respectively.

In order to prepare the heat-resistant layer, slurry was prepared by using 95 wt % of boehmite having an average particle diameter of 0.7 μm, 2 wt % of polyvinyl alcohol having a melting temperature of 220° C. and a saponification degree of 99%, and 3 wt % of acrylic latex having Tg of −52° C. In order to prepare the fusion layer, slurry for the fusion layer was prepared by diluting spherical particles having a glass transition temperature of 85° C. and an average particle diameter of 0.7 μm to a ratio of 12 wt % relative to water, wherein the spherical particles were prepared by polymerizing styrene, methyl methacrylate, butyl acrylate, butyl methacrylate, and 2-ethylhexyl acrylate as main components.

Example 4

Example 4 was performed in the same manner as in Example 3 except that the heat-resistant layer and the fusion layer were formed on one side of the base layer and only the fusion layer was formed on the other side. Here, the heat-resistant layer had a thickness of 3.0 μm, and the both-sided fusion layer had a thickness of 1.0 μm, respectively.

Example 5

Example 5 was performed in the same manner as in Example 4 except that the pouch type battery was assembled in the stacking manner, and heat-fused by applying heat and pressure at 100° C. and 1 MPa for 150 seconds, and then the electrolyte was injected.

Example 6

Example 6 was performed in the same manner as in Example 5 except that the fusion layer slurry was prepared by diluting polymer particles in which a spherical shape was maintained, a glass transition temperature was 32° C., and an average particle diameter was 0.7 μm to a ratio of 12 wt % relative to water, wherein the polymer particles were prepared by copolymerizing methyl methacrylate, butyl acrylate, and 2-ethylhexyl acrylate, and both of the heat-resistant layer and the fusion layer were simultaneously coated on both sides of the base layer, and then dried and wound in a roll form, thereby preparing a composite separation membrane in which the both-sided heat-resistant layer had a thickness of 1.5 μm, respectively, and the both-sided fusion layer had a thickness of 0.3 μm, respectively, and after this, the composite separation membrane was used to assemble a pouch type battery in the stacking manner, the battery was placed in a hot press in the absence of an electrolyte and heat-fused by applying heat and pressure at 75° C. and 1 MPa for 150 seconds, and then an electrolyte prepared by mixing ethylene carbonate (EC)/ethylmethyl carbonate (EMC)/dimethyl carbonate (DMC) at a volume ratio of 3:5:2 and containing 1M of lithium hexafluorophosphate (LiPF$_6$) dissolved therein, was injected.

Comparative Example 1

Comparative Example 1 was performed in the same manner as in Example 1 except that the separation membrane did not include the fusion layer.

Comparative Example 2

Comparative Example 2 was performed in the same manner as in Comparative Example 1 except that the battery was assembled without the electrolyte, and an electrolyte prepared by mixing ethylene carbonate (EC)/ethylmethyl carbonate (EMC)/dimethyl carbonate (DMC) at a volume ratio of 3:5:2 and containing 1M of lithium hexafluorophosphate (LiPF$_6$) dissolved therein, was injected.

Comparative Example 3

Comparative Example 3 was performed in the same manner as in Example 1 except that the separation membrane did not include the heat-resistant layer.

Comparative Example 4

A composite separation membrane was prepared in the same manner as in Example 1 except for using slurry in which 20 wt % of BA (butylacrylate) and EHA (ethylhexylacrylate) copolymer particles having a glass transition temperature of 5° C. and an average particle diameter of 0.2 μm were dispersed in water. Here, the both-sided heat-resistant layer had a thickness of 1.5 μm, respectively, and the both-sided fusion layer had a thickness of 0.8 μm, respectively. A battery was manufactured in the same manner as in Example 1 except that the composite separation membrane was used to manufacture the battery, followed by heat-fusion at a fusion temperature of 70° C. by applying heat and a pressure of 1 MPa for 150 seconds.

Comparative Example 5

Comparative Example 5 was performed in the same manner as in Example 2 except that a composite separation membrane was prepared by diluting methyl methacrylate copolymer particles having a glass transition temperature of 93° C. and an average particle diameter of 0.6 μm to a ratio of 15 wt % relative to water for the fusion layer, and using the dilution as the fusion layer slurry. Both of the heat-resistant layer and the fusion layer had a thickness of 1.4 μm.

Comparative Example 6

A total of four layers formed of the heat-resistant layer slurry and the fusion layer slurry were coated simultaneously and continuously without a separate drying process on a front surface/a rear surface of the base by using two multilayer slot coating dies, wherein the fusion layer slurry was prepared by diluting methyl methacrylate polymer particles having a glass transition temperature of 110° C. and an average particle diameter of 0.8 μm. Water (solvent) of the separation membrane was evaporated through a drier, and then the separation membrane was wound in a roll shape. The both-sided heat-resistant layer had a thickness of 1.5 μm, respectively, and the both-sided fusion layer had a thickness of 1.4 μm, respectively.

Then, the same process as in Example 2 was performed except that a pouch type battery was assembled in the stacking manner by using the separation membrane, and then, the battery was placed in a hot press in the absence of an electrolyte and heat-fused by applying heat and pressure at 100° C. and 1 MPa for 150 seconds, and an electrolyte prepared by mixing ethylene carbonate (EC)/ethylmethyl carbonate (EMC)/dimethyl carbonate (DMC) at a volume ratio of 3:5:2 and containing 1M of lithium hexafluorophosphate (LiPF$_6$) dissolved therein, was injected.

TABLE 1

| Classification | Unit | Example 1 | Example 2 | Example 3 | Example 4 | Example 5 | Example 6 |
|---|---|---|---|---|---|---|---|
| Gas permeability | sec/100 cc | 250 | 246 | 324 | 312 | 307 | 358 |
| Shrinkage ratio at 130° C. | % | 2.0 | 1.8 | 2.6 | 2.2 | 2.6 | 2.2 |
| Adhesive strength | gf/cm | 10.6 | 11.1 | 12.7 | 13.5 | 11.1 | 10.1 |
| Room temperature lifetime | % (1 C. 500 times) | 88.7 | 89.3 | 91.3 | 90.5 | 89.1 | 92.2 |
| Increase rate in battery thickness | % | 1.1 | 1.2 | 1.1 | 1.1 | 1.0 | 1.2 |
| Ra | μm | 0.16 | 0.15 | 0.15 | 0.19 | 0.21 | 0.22 |
| Evaluation of nail penetration | | L3 (pass) | L3 (pass) | L3 (pass) | L3 (pass) | L3 (pass) | L3 (pass) |

TABLE 2

| Classification | Unit | Comparative Example 1 | Comparative Example 2 | Comparative Example 3 | Comparative Example 4 | Comparative Example 5 | Comparative Example 6 |
|---|---|---|---|---|---|---|---|
| Gas permeability | sec/100 cc | 209 | 209 | 197 | 1274 | 225 | 214 |
| Shrinkage ratio at 130° C. | % | 2.5 | 2.5 | 35.9 | 2.3 | 2.3 | 2.2 |
| Adhesive strength | gf/cm | Adhesion was not possible | Adhesion was not possible | 14.7 | 5.1 | Adhesion was not possible | Adhesion was not possible |
| Room temperature lifetime | % (1 C. 500 times) | 72.2 | 71.7 | 89.7 | 57.2 | 65.1 | 70.1 |
| Increase rate in battery thickness | % | 5.9 | 4.8 | 1.1 | 1.4 | 4.9 | 5.2 |
| Ra | μm | 0.57 | 0.21 | 0.46 | 0.20 | 0.21 | 0.17 |
| Evaluation of nail penetration | | L3 (pass) | L3 (pass) | L5 (fail) | L3 (pass) | L3 (pass) | L3 (pass) |

From the above results, it could be appreciated that all of Examples of the present invention exhibited simultaneously and remarkably excellent properties in gas permeability, adhesive strength, and room temperature lifetime, and in Comparative Examples not belonging to the category of the present invention, as shown in Comparative Examples 4 to 6, adhesion was not achieved, or the degree of gas permeability were remarkably deteriorated, or the room temperature lifetime was remarkably lowered. That is, it was confirmed that when the fusion layer composed of the amorphous polymer particles having the glass transition temperature of 30° C. to 90° C. and a difference between the glass transition temperature and the fusion temperature of 60° C. or lower and the heat-resistant layer composed of the inorganic material and the binder were included at the same time, the battery lifetime and safety were remarkably increased.

While exemplary embodiments of the present disclosure have been shown and described above, the scope of the present invention is not limited thereto, and it will be apparent to those skilled in the art that modifications and variations could be made without departing from the scope of the present invention as defined by the appended claims.

INDUSTRIAL APPLICABILITY

The composite separation membrane according to the present invention may be uniformly and strongly fused over the entire area of the cathode and the anode of the secondary battery having a large area while simultaneously improving the lifetime and safety of the battery, and may facilitate ion movement through uniformly distributed pores of each layer, which is advantageous in improving performance of a large-sized secondary battery for an electric vehicle, and in providing very good lifetime characteristic of the battery.

The invention claimed is:

1. A composite separation membrane for a lithium secondary battery comprising:
   a porous base layer;
   a heat-resistant layer including inorganic particles connected and fixed by a binder polymer, and formed on the porous base layer; and
   a fusion layer including amorphous polymer particles having a glass transition temperature of 30° C. or higher to 90° C. or lower, and formed on the heat-resistant layer.

2. The composite separation membrane for a lithium secondary battery of claim 1, wherein a difference between the glass transition temperature of the amorphous polymer particles and a fusion temperature at the time of fusion of the composite separation membrane with electrodes is 60° C. or lower.

3. The composite separation membrane for a lithium secondary battery of claim 1, further comprising:
   an interfacial layer formed between the heat-resistant layer and the fusion layer and having the inorganic particles and the amorphous polymer particles mixed therein.

4. The composite separation membrane for a lithium secondary battery of claim 1, wherein the inorganic particles of the heat-resistant layer have a size of 0.1 to 2.0 μm.

5. The composite separation membrane for a lithium secondary battery of claim 1, wherein the amorphous polymer particles of the fusion layer have a size of 0.05 to 0.8 μm.

6. The composite separation membrane for a lithium secondary battery of claim 1, wherein the fusion layer has a thickness of 2 μm or less.

7. The composite separation membrane for a lithium secondary battery of claim 1, wherein the amorphous polymer is formed of an acrylate-based polymer, a methacrylate-based polymer, or a copolymer thereof.

8. The composite separation membrane for a lithium secondary battery of claim 1, wherein the heat-resistant layer includes one or two or more inorganic particles selected from aluminum oxide, barium titanium oxide, titanium oxide, magnesium oxide, clay, glass powder, boron nitride, and aluminum nitride.

9. A preparation method for a composite separation membrane for a lithium secondary battery comprising:
  applying a heat-resistant layer coating liquid including inorganic particles and a binder polymer to one side or both sides of a porous base; and
  applying a fusion layer coating liquid including amorphous polymer particles having a glass transition temperature of 30° C. or higher to 90° C. or lower on the applied heat-resistant layer coating liquid.

10. The preparation method of claim 9, wherein the heat-resistant layer coating liquid is applied, and then the fusion layer coating liquid is applied without drying the heat-resistant layer coating liquid, thereby performing simultaneous coating.

11. The preparation method of claim 9, wherein a difference between the glass transition temperature of the amorphous polymer particles and a fusion temperature of the fusion layer is 60° C. or lower.

* * * * *